US009520074B2

(12) United States Patent
Havens et al.

(10) Patent No.: US 9,520,074 B2
(45) Date of Patent: *Dec. 13, 2016

(54) DEGRADABLE IDENTIFICATION COMPONENT

(71) Applicant: College of William and Mary, Williamsburg, VA (US)

(72) Inventors: Kirk J. Havens, Plainview, VA (US); Donna Marie Bilkovic, Gloucester Point, VA (US); David M. Stanhope, Hayes, VA (US); Kory T. Angstadt, Gloucester, VA (US)

(73) Assignee: College of William and Mary, Williamsburg, VA (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/180,658

(22) Filed: Feb. 14, 2014

(65) Prior Publication Data

US 2014/0157649 A1 Jun. 12, 2014

Related U.S. Application Data

(63) Continuation-in-part of application No. 13/771,661, filed on Feb. 20, 2013, now abandoned, which is a
(Continued)

(51) Int. Cl.
*A01K 69/06* (2006.01)
*A01K 69/08* (2006.01)
(Continued)

(52) U.S. Cl.
CPC ............... *G09F 3/02* (2013.01); *A01K 69/06* (2013.01); *A01K 69/08* (2013.01); *A01K 75/00* (2013.01); *Y10T 428/31786* (2015.04)

(58) Field of Classification Search
CPC ........ A01K 69/00; A01K 69/06; A01K 69/08; A01K 69/10
(Continued)

(56) References Cited

U.S. PATENT DOCUMENTS 1,728,645 A * 9/1929 Ward ................... A01K 69/08
43/100
3,426,472 A * 2/1969 Richard ............... A01K 69/08
43/100
(Continued)

FOREIGN PATENT DOCUMENTS

AU WO 2010015013 A1 * 2/2010 ............ A01K 69/08
DE 4324449 A1 * 1/1995 ............ A01K 69/06

OTHER PUBLICATIONS

Bilkovic, Havens, Stanhope, and Angstadt, "Use of Fully Biodegradable Panels to Reduce Derelict Pot Threats to Marine Fauna", Conservation Biology, (2012) vol. 26, No. 6, p. 957-966.

*Primary Examiner* — Darren W Ark
(74) *Attorney, Agent, or Firm* — Jason P. McDevitt

(57) ABSTRACT

Herein we describe fishing gear having a degradable identification component comprising a polyhydroxyalkanoate polymer, as well as methods for ensuring that such identification component degrades quickly after detachment. Aquatic debris has a negative economic and ecological impact, and thus it is advantageous to use implements that will degrade into environmentally benign compounds. Incorporating a degradable identification component into fishing gear provides an effective, economical solution. Suitable degradable identification components are described herein.

10 Claims, 5 Drawing Sheets

Related U.S. Application Data continuation-in-part of application No. 13/403,083, filed on Feb. 23, 2012, now abandoned.

(60) Provisional application No. 61/766,860, filed on Feb. 20, 2013.

(51) Int. Cl.
*A01K 69/00* (2006.01)
*G09F 3/02* (2006.01)
*A01K 75/00* (2006.01)

(58) Field of Classification Search
USPC .............................. 43/100–105, 4.5, 4, 43.12
See application file for complete search history.

(56) References Cited

U.S. PATENT DOCUMENTS

| | | | | |
|---|---|---|---|---|
| 3,654,725 A * | 4/1972 | Kingston | A01K 97/02 43/44.99 |
| 3,724,120 A * | 4/1973 | Richard | A01K 69/06 43/100 |
| 3,842,529 A * | 10/1974 | Richard | A01K 97/02 43/100 |
| 3,992,804 A * | 11/1976 | Senese | A01K 69/08 43/100 |
| 4,159,591 A * | 7/1979 | Plante | A01K 69/08 43/100 |
| 4,262,379 A * | 4/1981 | Jankiewicz | A01K 69/08 43/100 |
| D259,434 S * | 6/1981 | Plante | D22/121 |
| D259,435 S * | 6/1981 | Plante | D22/121 |
| 4,445,295 A * | 5/1984 | Litrico | A01K 69/06 43/100 |
| 4,648,199 A * | 3/1987 | Deaton et al. | A01K 69/08 43/100 |
| 4,648,200 A * | 3/1987 | Miller et al. | A01K 69/08 43/100 |
| 4,790,103 A * | 12/1988 | Tarantino | A01K 69/08 43/102 |
| 5,244,731 A * | 9/1993 | Saito | A01K 75/00 43/7 |
| 5,259,809 A * | 11/1993 | Rainey, Jr. | A01K 69/06 43/100 |
| 5,281,691 A * | 1/1994 | Hubbs | C08G 63/08 528/354 |
| 5,301,450 A * | 4/1994 | Boyd | A01K 75/00 43/104 |
| 5,351,435 A * | 10/1994 | Hill | A01K 69/10 43/100 |
| D367,695 S * | 3/1996 | Erlandson | D22/121 |
| 5,594,076 A * | 1/1997 | Gordon, III | C08G 63/183 43/44.98 |
| 5,890,316 A * | 4/1999 | Rodgers | A01K 83/00 43/43.16 |
| 5,894,694 A * | 4/1999 | Erlandson | A01K 69/06 43/100 |
| 7,958,668 B2 * | 6/2011 | Walter | A01M 23/16 43/58 |
| 8,375,623 B2 * | 2/2013 | Havens | A01K 69/06 43/100 |
| 8,938,908 B2 * | 1/2015 | Havens | A01K 69/06 43/100 |
| 2005/0229477 A1 * | 10/2005 | Gomez, Jr. | A01K 69/10 43/100 |
| 2007/0261292 A1 * | 11/2007 | December | A01K 69/06 43/100 |
| 2009/0249681 A1 | 10/2009 | Havens | |
| 2012/0144722 A1 * | 6/2012 | Havens | A01K 69/06 43/100 |
| 2013/0160351 A1 * | 6/2013 | Havens | A01K 69/06 43/100 |
| 2013/0180138 A1 * | 7/2013 | Luea | G09F 3/04 40/306 |
| 2013/0239449 A1 * | 9/2013 | Heinrichs | G09F 3/0288 40/665 |
| 2014/0245655 A1 | 9/2014 | Havens | |
| 2014/0305026 A1 * | 10/2014 | Pemberton | A01K 69/06 43/100 |
| 2015/0135580 A1 * | 5/2015 | Havens | A01K 69/06 43/4.5 |

\* cited by examiner

DEGRADABLE IDENTIFICATION COMPONENT

CROSS-REFERENCE TO RELATED APPLICATIONS

This patent application is a continuation-in-part of co-pending U.S. patent application Ser. No. 13/771,661, filed Feb. 20, 2013, which is a continuation-in-part of abandoned U.S. patent application Ser. No. 13/403,083, filed Feb. 23, 2012, and this application also claims the benefit of and priority to U.S. Provisional Patent Application Ser. No. 61/766,860 filed Feb. 20, 2013, the entire contents of which are herein incorporated by reference in their entireties.

STATEMENT REGARDING FEDERALLY SPONSORED RESEARCH AND DEVELOPMENT

Not applicable.

FIELD OF INVENTION

The field of the invention relates to degradable identification components associated with fishing gear designed to catch crabs, crustaceans, fish, or other aquatic species.

BACKGROUND OF THE INVENTION

Derelict (i.e., lost or abandoned) commercial fishing gear, including nets and traps, can present safety, nuisance, and environmental impacts in freshwater, estuarine, and marine waters. Fishing gear can become derelict for a number of reasons, e.g., buoy lines can be severed by vessel propellers or break due to age, buoy materials can fail, storms can roll the traps pulling the buoy below the surface, and traps can be vandalized or abandoned.

The quantity of derelict fishing gear in the nation's estuaries and coasts is unknown. In a pilot study in Virginia, the density of derelict pots in a specific crab fishing sector was determined to be about one pot per 12 acres (Havens, K. J., et al. "The effects of derelict blue crab traps on marine organisms in the lower York River, Virginia", *North American Journal of Fisheries Management* (2008), 28, pp. 1194-1200). It has been suggested that 250,000 derelict crab traps are added to the Gulf of Mexico annually, based on an estimated 25% loss/abandonment rate and an annual total number of traps fished commercially of approximately 1 million. The Gulf States Marine Fisheries Commission has estimated blue crab derelict fishery losses of as high as 4 to 10 million crabs a year in Louisiana (Guillory, V., et al., *Proceedings: Blue Crab Mortality Symposium*, Gulf State Marine Fisheries Commission (2001) Ocean Springs, MS, pp. 28-41). For more information related to the quantity of derelict gear, see Example 1.

Derelict fishing gear damages sensitive habitats and continues to capture both target and by-catch species, a process known as "ghost fishing", leading to reduced fitness and delayed mortalities of aquatic species. Beyond ghost fishing, the derelict fishing gear can break apart, causing massive amounts of non-biodegradable material to enter the aquatic ecosystem.

The effect of derelict fishing gear is significant, and various states and regions have enacted measures to reduce the ecological and economic impacts of abandoned equipment. The emphasis thus far has been on ghost fishing. For example, the state of Florida enacted regulations (CH 46-45, F.A.C., effective Jan. 1, 1995) establishing degradability requirements for blue crab traps. Traps are considered legal in Florida if a non-degradable trap lid (such as a metal panel) is secured to the trap using degradable materials such as jute twine or corrodible hooks. Since the focus is on ghost fishing, these regulations fail to regulate the significant amount of aquatic debris created by derelict fishing gear each year.

Compounding the problem is the use of non-degradable plastic components. For instance, various components such as trap lids and identification tags made of plastic can detach from derelict fishing gear. Once disengaged, the buoyancy of plastic causes the debris to float and ocean currents can deposit plastic on foreign coasts. It is a common occurrence for fishing gear components originating in the United States to end up across the Atlantic Ocean in the United Kingdom and Ireland. These non-degradable plastic components remain largely intact despite spending years afloat, and therefore can be easily traced to the issuing state. Furthermore, plastics can themselves be toxic or can absorb toxic pollutants, and can be considered hazardous waste. Therefore, the transportation of plastic materials raises both ecological and political issues concerning proper stewardship.

There remains a need for an improved identification component that degrades quickly in an aquatic environment after fishing gear becomes derelict. Ideally, any such implementation would not degrade significantly while being actively fished, but degrade within a period of time after the fishing gear becomes derelict. We have identified a degradable plastic, polyhydroxyalkanoate (PHA), as an exceptional material for such purposes. The present invention modifies existing identification components with a novel degradable polymer that breaks down into benign constituents. To reduce the economic burden on fishermen, it would be advantageous if the degradable identification components could be inexpensively substituted for existing systems of identification, thereby providing the desired degradability without requiring the purchase of expensive new equipment.

BRIEF SUMMARY OF THE INVENTION

A modification to improve identification components to mitigate the impact of aquatic, plastic debris may be considered a viable and effective option if: 1) the identification component remains functional for as long as it is supposed to remain functional (e.g., one fishing season); 2) the identification component degrades reasonably quickly once it is abandoned in an aqueous environment, and once degraded, is environmentally benign; and 3) the identification component is relatively inexpensive and easy to install in order to be of practical use. To meet the above criteria, we developed a plurality of embodiments that degrade in a predictable manner both when actively fished and when continuously submerged.

Polyhydroxyalkanoate (PHA) has certain unexpected properties. This material has two distinct rates of decay depending on whether the material is (1) periodically exposed to light and/or air, as occurs when PHA fishing gear is actively fished, or (2) continuously submerged in an aquatic environment, as occurs when PHA fishing gear is abandoned. During the time that the gear is actively fished, the gear is mostly submerged, but is regularly brought to the surface to harvest the catch. When gear becomes derelict, the identification component continuously soaks in the aquatic environment. PHA has the unexpected advantage of degrading substantially more slowly when actively fished in an aquatic environment than when continuously soaked in an aquatic environment. Therefore, a novel feature of the present invention is that the degradable identification component degrades at a faster rate when continuously soaked than when actively fished.

PHA meets the functional requirement that the material must be environmentally benign. The material degrades in an aquatic environment into benign monomers and oligomers. When the material breaks apart, each smaller piece is itself biodegradable. While many plastics have been described as being degradable, most do not break down into benign components, i.e., most are not truly biodegradable. In other words, other plastics will break apart into very small pieces that pose a substantial risk to the aquatic ecosystem. For instance, small pieces of polypropylene enter the aquatic food chain, and accumulate in the fatty tissue of aquatic species, such as fish and crab. The fatty tissues become more concentrated with toxins as organisms mature, posing a significant risk for higher order species including birds and humans.

Herein we describe a degradable identification component to reduce aquatic debris by utilizing a PHA polymer. This material has the unexpected property of degrading faster when continuously soaked in an aquatic environment than when it is periodically removed from an aquatic environment and exposed to, for example, light and air. Further the material is truly biodegradable, and breaks down into benign monomers and oligomers. Two types of identification are common with respect to fishing gear. The first is a tag that identifies the owner of the fishing gear and may establish the law related to personal property. The second is a permit issued by the state or federal government agency that serves as a way to limit catch. One or both of these identifiers can comprise a PHA polymer, which has the unexpected advantage of degrading at a faster rate once continuously submerged than while being actively fished.

Herein we describe a method of utilizing a degradable identification component to reduce aquatic debris. The method comprises the steps of providing an identification component comprising a PHA polymer attached to the fishing gear. The fishing gear is exposed to an aquatic environment, causing the identification component to degrade. The identification component comprises PHA; therefore; the identification component degrades at a faster rate when the fishing gear is abandoned as compared to when the fishing gear is actively fished. This allows the identification component to pose substantially less risk to aquatic wildlife and the greater ecosystem.

BRIEF DESCRIPTION OF THE DRAWINGS

The summary above, and the following detailed description, will be better understood in view of the drawings which depict details of preferred embodiments.

DETAILED DESCRIPTION OF THE INVENTION

Figure 1:
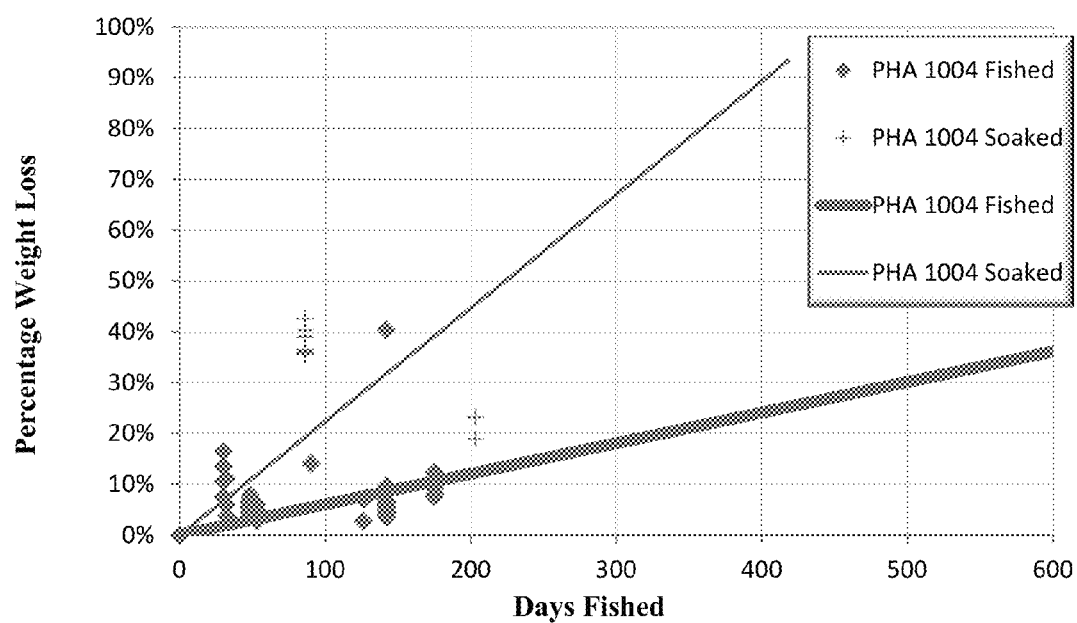
FIG. 1 shows a line graph plotting, as a function of time, the percentage loss of weight of polyhydroxyalkanoate (PHA) degradable cull panels that were either fished or continuously soaked. Individual data points from field trials, as well as the lines of best fit for the fished and continuously soaked degradable cull panels, are shown.

The present invention is directed to degradable identification components and methods for reducing plastic debris in aquatic ecosystems by using a polyhydroxyalkanoate polymer. The term "fishing gear" or "fishing implement" refers to traps, nets, and other known devices that function to retain a targeted species within an area or volume. The present invention is not limited to metal traps, but includes traps, nets, and other gear of various materials such as wood and plastic. This fishing gear could benefit from a degradable identification system that has a predictable, dual rate of decay depending on whether the gear is actively fished versus continuously submerged.

The degradable identification components herein described can be used with traps for various types of fish and shellfish including but not limited to crabs (e.g., *Callinectes sapidus* (blue crab), *Metacarcinus magister* (Dungeness crab), *Paralithodes camtschaticus* (red king crab), and *Chionecetes* spp. (snow crabs)), lobsters (e.g., *Homarus americanus* (American lobster) and *Panulirus argus* (Caribbean spiny lobster)), fish (e.g., black sea bass (*Centropristis striata*) and sablefish (*Anoplopoma fimbria*)), or any other aquatic species. The degradable identifiers can also be used for nets, and other fishing gear designed to retain a targeted species. The degradable identification components can be used in all coastal and ocean trap fisheries, as well as in lakes and rivers.

The term "identification component" or "identifier" refers to either a tag that typically identifies the owner of the fishing gear and may also include a warning against theft or other language that establishes the law related to personal property; or a government-issued permit which typically is issued before the fishing season and serves to limit the quantity of fishing gear deployed in a given region.

A "degradable identification component" or "degradable identifier" refers to a "identification component" or "identifier" comprising a polyhydroxyalkanoate polymer (PHA). The degradable identification component breaks down under aquatic conditions into benign monomers and oligomers. PHA polymers are true biopolymers, produced in nature by bacterial fermentation of sugar and lipids. They are linear polyesters, and more than 150 different monomers can be combined within this family to give polymers with a wide variety of properties. Some common PHA polymers include poly-3-hydroxybutyrate, polyhydroxyvalerate, and co-polymers thereof.

While many plastics have been described as being degradable, it is important to use only a polymer that legitimately degrades in an aquatic environment into monomers and oligomers. In order to be environmentally benign, it is advisable not to use plastics that will break apart into very small pieces that are themselves not biodegradable. It is not desirable, for example, to use polypropylene formulations wherein the macrostructure of the plastic breaks down in an aquatic environment, but small pieces of polypropylene that do not biodegrade would then be ingested by aquatic organisms. Once ingested, non-biodegradable plastics have the potential to accumulate in the fatty tissue of aquatic species, posing risks for the entire food web.

"Detachment" refers to the release of the degradable identification component from the fishing gear. Note that detachment does not require complete degradation of the identification component. Rather, under typical use conditions, a point of weakness will develop causing the identification system to detach from the derelict fishing gear. Subsequent to the time of detachment, the degradable component of the present invention will completely degrade in an aquatic environment into benign monomers and oligomers.

Various fisheries have different interests in the time to detachment (due to different lengths in fishing seasons) and a degradable identification component can be designed to meet those different time frames. The time to detachment is further complicated by the fact that underwater aquatic environments can have substantial variability in terms of pressure, temperature, salinity, and biodiversity, all of which can impact the rate of degradation. Across the board, there are two important time considerations with respect to the durability and degradation of the component.

The first functional requirement is that the degradable identification component must remain intact for the entire fishing season during normal use. Fishing seasons vary by jurisdiction, but often extend for periods of about 8 months. This functional requirement allows the personal property of the fisherman to be identified for the entire fishing season and allows the state to police the quantity of fishing gear deployed each fishing season. Neither the fisherman nor the state want "solutions" to the problem of aquatic debris that are costly in terms of money or labor; therefore, any commercially viable degradable identification component should last at least one fishing season. It would be particularly problematic if state-issued permits failed while being actively fished. The state would be concerned about a fraudulent use of the lost permit and the fisherman would be frustrated with the added hassle of reapplying for the permission to fish. This failure in particular would reduce the likelihood that the state would subsequently use or recommend the product. Accordingly, it is important for degradable identification components to last at least as long as the fishing season of the targeted species when the fishing gear is actively fished.

The second functional requirement is that after the fishing gear becomes derelict, the degradable identification component should degrade reasonably quickly, defined herein as degrading sufficiently such that detachment occurs within one year of the fishing gear becoming derelict. Faster degradation of the identification component means less time that it is an aquatic pollutant that could be ingested by aquatic species.

This is a difficult balancing act, as one would like a degradable identification component that has (i) little or no chance of degrading sufficiently while being actively fished, yet (ii) quickly degrades once the fishing gear becomes abandoned such that the identification component does not accumulate as aquatic debris. Assuming a consistent rate of decay throughout both the period when the gear is actively fished and when it becomes derelict, then it would be almost impossible for a material to fulfill both of the functional requirements described above. In other words, if the decay rate is linear, then in order to ensure sufficient durability during a period of active fishing of, for example, 8 months, degradable components would not be assured of failing to the point of detachment within a period of less than one year after becoming derelict. It is not easy to balance the need for sufficient durability while the trap is actively fished with the need for rapid degradation once a trap becomes derelict.

However, these two periods of use have distinctive features. During the time that the gear is actively fished, the degradable identification component is mostly submerged in an aquatic environment and is periodically brought to the surface to harvest the targeted species. When fishing gear becomes derelict, the degradable identification component continuously soaks in the aquatic environment. Assuming a linear rate of decay throughout both the period when the gear is actively fished and when it becomes derelict, then it would be almost impossible to satisfy the above-described balancing act. In other words, assuming this linear decay, if sufficient durability was ensured during the period of active fishing of 8 months, then degradable components would not be assured of detaching and degrading within a period of less than 12 months from the point of abandonment, given the variability in decay rate due to salinity, temperature, microbial composition, etc.

Fortunately, we have identified that PHA degrades in an aquatic environment and has the unexpected advantage of degrading substantially more slowly when actively fished in an aquatic environment than when continuously soaked in an aquatic environment. A component comprising PHA can have sufficient durability while the trap is actively fished, but rapidly degrades once a trap becomes derelict. In other words, a degradable identification component can be designed such that it remains intact during a single active fishing season of eight months, but detaches when continuously soaked in an aquatic environment for twelve months.

In a long term study of degradable cull panels made from PHA, panels were deployed in crab traps that were either actively fished or submerged continuously. In the examples that follow, degradation is determined by monitoring the weight of (dried) degradable components. FIG. 1 compares PHA degradable cull panels that were actively fished to PHA panels that were continuously soaked. As shown in FIG. 1, the component degrades by weight at least twice as much when the trap is abandoned and continuously submerged than when the trap is actively fished.

PHA cull panels had the unexpected advantage of degrading at a faster rate once continuously submerged than while being actively fished. This is an unexpected and important result. It is not easy to balance the need for sufficient durability while the trap is actively fished with the need for rapid degradation once a trap becomes derelict. But, PHA components had the unexpected advantage of degrading at a faster rate once continuously submerged than while being actively fished. This is an enormous benefit, as it allows one to meet the difficult balancing act described above.

Figure 2A:
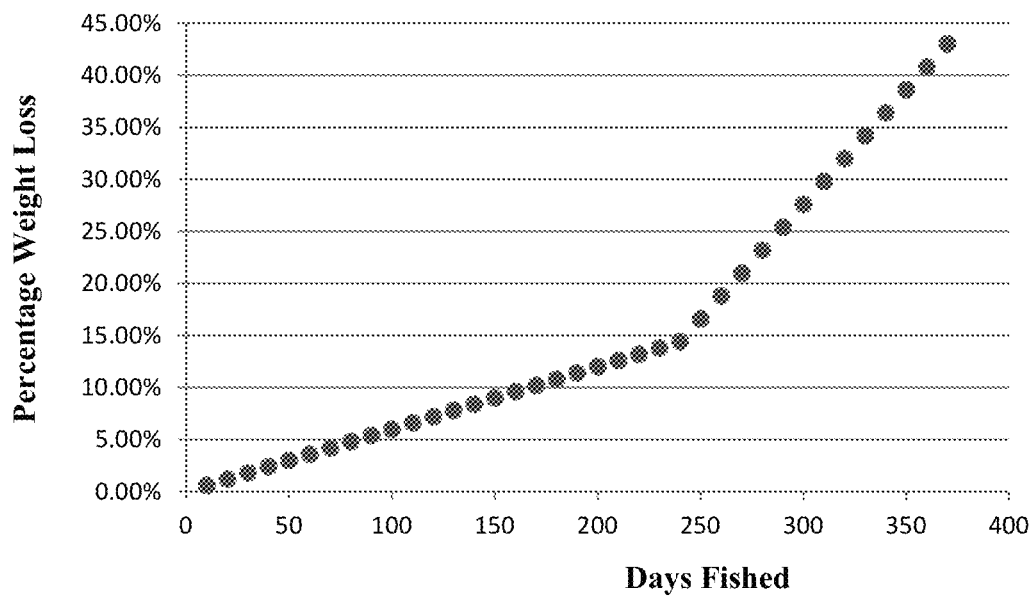
FIG. 2A shows a line graph plotting, as a function of time, the percentage loss of weight of a representative PHA degradable cull panel that is abandoned at 8 months.
Figure 2B:
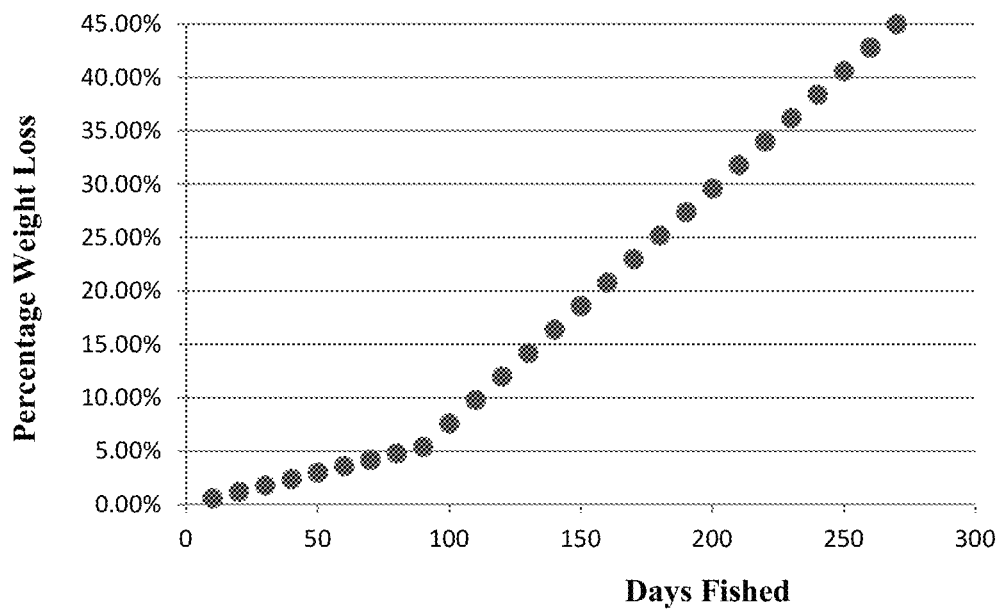
FIG. 2B shows a line graph plotting, as a function of time, the percentage loss of weight of a representative PHA degradable cull panel that is abandoned at 3 months.

FIGS. 2A and 2B demonstrate the implications of the dual rate of degradation. FIG. 2A shows the degradation as a function of time for a representative PHA cull ring panel attached to a crustacean trap. Until approximately 8 months, the trap is actively fished, as shown by the dotted line through 240 days. The trap then becomes derelict, and the degradable cull ring panel is continuously soaked. The increased rate of degradation is shown by the dotted line after 240 days. FIG. 2B shows an analogous graph for a crustacean trap that is abandoned after 90 days.

Figure 3:
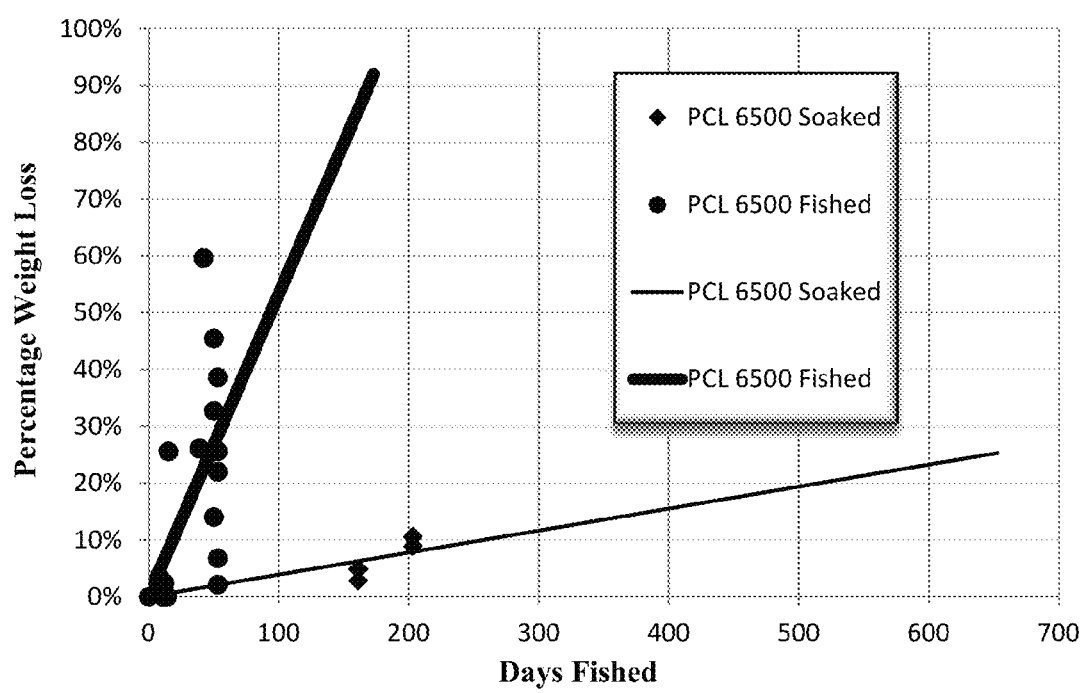
FIG. 3 shows a line graph plotting, as a function of time, the percentage loss of weight of polycaprolactone (PCL) degradable cull panels that were either fished or continuously soaked. Individual data points from field trials, as well as the lines of best fit for the fished and continuously soaked degradable cull panels, are shown.

Other plastics do not have this unexpected property. The long term study of degradable cull panels also tested a high molecular weight polycaprolactone, PCL CAPA® 6500 (supplied by Perstorp UK Ltd., Cheshire, United Kingdom). As shown in FIG. 3, degradable panels made from PCL degraded much faster when actively fished than when continuously soaked. This is a marked contrast to degradable panels made from PHA that degraded faster when continuously soaked than when actively fished.

There are many variables that impact when and if an identification component will degrade. The long term study suggests that degradation is usually not consistent throughout the component. The injection molding process can have an influence. Imperfections in the degradable identification components (i.e., due to poor polymer flow) can increase the likelihood of failure. Handling of the fishing gear and degradable identification components can have an impact, and obviously the water conditions and local environment will have an effect.

Figure 4:
FIG. 4 shows a perspective image of a tag which identifies the owner of a fishing gear.

The design of an identification component suitable for attachment to fishing gear, for instance a lobster trap, is shown in representative FIG. 4. Also referred to as a tag, the identification component serves the function of identifying the owner of the fishing gear. In this prior art identification component, possibly made from polyethylene, the owner identified on the tag is VanSalisbury, as shown in FIG. 4. The owner's last name along with a series of numbers is shown in raised typeface, but other methods of engraving or embossing are contemplated according to the methods of the present invention. Along with the owner's name, the tag offers a warning identifying the fishing gear as personal property. The tag reads, "WARNING—Theft of this property and/or its contents is punishable by law. A fine and/or imprisonment may result." This warning establishes the applicable law related to fishing gear and personal property in the relevant jurisdiction. The text of this warning is shown in raised typeface, but other methods of engraving or embossing or imprinting are contemplated. The tag has a degradable physical barrier, typically in the form of a solid panel or slat which enhances the visibility of the typed description.

The degradable identification component can be affixed to the wall of a trap, to a portion of the net, or to other fishing gear. For instance, the tag shown in FIG. 4 is installed to be flush with the wall of a lobster trap. The tag includes two through holes near the outer edge, which are useful attachment points to connect the tag to the fishing gear. The outer edge of the through holes has an increased thickness to enhance durability. There is often significant stress in the vicinity of attachment points. Accordingly, in order to prevent premature detachment of the degradable tag, it can be advantageous to reinforce the edges by making them thicker or wider.

The degradable identification component can be secured into place using methods known in the art, including fasteners, wire, twine, nails, screws, staples, clips, hinges, or ties, which may or may not be made from degradable materials. Any such fastening devices can also be built into the degradable identification component (e.g., the degradable identification component could be in the form of a cable tie made from PHA). Alternatively, a connector may be forcibly inserted through the identification component (e.g., a screw is drilled through the tag and is connected to the underlying trap, without the use of pre-manufactured holes). As previously mentioned, the degradable component comprising PHA will degrade faster when continuously soaked, rather than actively fished. This approach is cost-effective, easy to enforce, and user-friendly because replacement degradable components are easy to install.

Figure 5:
FIG. 5 shows a perspective image of a state issued permit.

The design of an identification component suitable for attachment to fishing gear, for instance a lobster trap, is shown in representative FIG. 5, which depicts a prior art identification component made from a non-biodegradable plastic such as polyethylene. Referred to as a permit, the identification component allows states or the federal government to regulate the quantity of fishing gear used in a given jurisdiction. For instance, in order to be legal, a lobster pot in Maine territorial waters must have a permit attached to the trap, and the permit must be replaced annually. Maine can limit the number of lobster traps by only issuing a set quantity of permits. These permits typically consist of an alphanumeric distinguisher. As shown in FIG. 5, the series of numbers and letters is shown in a colored, engraved typeface, but other methods of engraving or embossing or imprinting are contemplated.

The permit is installed by looping it around a segment of the fishing gear. The permit includes a locking mechanism that secures the permit to the trap. In this way, a government agency can ensure that each permit corresponds to exactly one trap, net, or other fishing implement. The locking mechanism can have a spline, ratchet, or other mechanism that operates to secure the permit to the fishing gear in an irreversible manner. Commercial waterman typically must attach permits to traps to adhere to local fishing regulations. Attaching a degradable permit rather than a non-degradable permit is not significantly more burdensome.

The degradable identification component that identifies the owner can be used in conjunction with a degradable identification component issued by a state or federal government agency to permit fishing. Therefore both a tag and a permit can be attached to a single fishing implement. For ease of manufacturing, the tag and the permit can comprise a continuous piece of PHA polymer. To reduce material costs, the overall dimensions of the identification component should be minimized in light of considerations of visibility and readability. Note that FIGS. 4 and 5 are images showing representative design embodiments, but other embodiments of the invention can have different length, width, and/or thickness, as well as differences in the overall design.

The present invention requires that the degradable identification components comprise a PHA polymer, regardless of whether the degradable identification component is a tag or a permit. Moderating the rate of degradation can be achieved, for example, by altering any of a number of factors, including but not limited to: the molecular weight of the polymer, the choice of or concentration of plasticizer of other additives, a coating on the polymer, surface imperfections, or the design of the degradable identification component, in particular its thickness.

The design of the identification component is often proscribed by the jurisdiction and conventions regarding typeface and warnings should be maintained. Currently, many jurisdictions utilize a non-biodegradable plastic that has a pronounced longevity. For instance, a tag lost in the 1991 "Perfect Storm" washed up onshore in Ireland after drifting at sea for nearly two decades.

A tag or permit comprising PHA polymer has none of the deleterious environmental impacts associated with most plastics found in marine environments. Rather, PHA is a true biopolymer and breaks down into benign monomers and oligomers. By utilizing PHA tags and permits, the information contained on the tag or permit would remain the same, while the environmental footprint of the fishing industry would substantially decrease. Aquatic creatures would be exposed to less toxins, creating a more robust fishery in a purer environment. Further, tags and permits comprising PHA would degrade long before they reach distant shores. Both political and ecological considerations weigh in favor of PHA as a suitable material.

The degradable identification components described herein can be used in conjunction with a degradable component that functions to obstruct an exit or functions to connect to the fishing gear. The degradable component that functions to obstruct an exit of the fishing gear can take the form of a panel, slat, gate, cull ring panel, cull ring, or other similar physical barrier. The degradable component functions to connect to the fishing gear can take the form of a wire, nail, screw, staple, clip, hinge, tie, fastener, or other connector known in the art. These degradable components comprise a PHA polymer, with the dual rate of decay described previously.

One problem associated with derelict fishing gear is that it continues to capture both target and by-catch species, a process known as "ghost fishing." By incorporating a degradable component that functions to obstruct an exit or functions to connect to the fishing gear, ghost fishing can be reduced. When the fishing gear becomes derelict, the degradable component functionally degrades and the exit of the fishing gear becomes unobstructed. Therefore, all aquatic species that enter the fishing gear can escape. In addition to reducing ghost fishing, the use of these components reduces aquatic debris.

Alternatively, identification information can be transcribed on the degradable components that functions to obstruct an exit. For example, if the state of Virginia mandated the use of PHA cull ring panels to reduce ghost fishing, these same PHA cull ring panels could be transcribed with permit information, eliminating the need for a stand-alone permit. Tag information, such as the owner's name, can be imprinted on a panel, slat, gate, cull ring panel, cull ring, or other similar physical barrier that obstructs an exit of the fishing gear. The identification information (typically contained on a tag and/or permit) can be displayed in raised typeface, or other methods known in the art for imparting the identification information can be utilized.

EXAMPLES

The examples that follow are intended in no way to limit the scope of this invention but instead are provided to illustrate representative embodiments of the present invention. Many other embodiments of this invention will be apparent to one skilled in the art.

Example 1

Active and derelict traps were assessed in two regions of the lower Chesapeake Bay to determine the fishing pressure and presence of derelict gear. During the crabbing season in October 2006, boat surveys were conducted and Global Positioning System (GPS) positions recorded for buoyed (active) traps over approximately 33.3 km$^2$ in the mainstem lower York River and approximately 0.2 km$^2$ in an adjacent tributary named Sarah Creek.

The number of derelict blue crab traps was estimated with a benthic mapping survey of the same area during non-fishing time periods (York River-January/February 2006; Sarah Creek-November 2005, resurveyed January/February 2006). Side-scan sonar technology mounted to the vessel hull was utilized (Marine Sonics Sea Scan, 600 KHz transducer) to collect real-time, geo-referenced data with overlapping edges matched to form a continuous profile of the bottom. The surveys were completed in 100 meter swaths with 20% overlap of tracks. This equipment provided high-resolution digital images of crab traps. Geo-referenced trap images were converted to Geographic Information Systems (GIS) shape files. Ground-truth activities included removing targets in Sarah Creek identified from side-scan sonar images as derelict crab traps to test the accuracy of trap identification. Potential errors in image identification were estimated from ratios of suspected derelict traps identified by side scan sonar to field verified derelict traps. Derelict traps were retrieved by boat using GPS coordinates obtained from the side scan sonar and a grappling hook. Nekton species captured in the derelict traps removed from the system were enumerated and measured. Derelict trap/buoyed trap ratio was used to estimate fishing pressure and potential trap loss. To assess the potential for annual trap loss, the Sarah Creek site was surveyed in the non-fishing season (fall/winter 2005) and derelict crab traps were removed. The area was re-surveyed in July 2006 for both active and derelict traps. Trap loss rates were estimated by comparing active (buoyed) traps and derelict traps over subsequent years.

Results. Side scan surveys identified 676 potential derelict trap targets. Ninety-four percent (16 out of 17) of a subset of side-scan sonar targets in Sarah Creek were correctly identified as derelict blue crab traps resulting in a 6% identification error. Of the derelict trap estimate, 89 crab traps (approximately 14%) were considered abandoned rather than lost because attached floating buoys were present and were identified during the closed season. Of the 33 derelict traps removed from the York River, 27 of them (82%) were still functional. Active and derelict trap surveys in the entire lower York River (33.5 km$^2$), including Sarah Creek, located 635 to 676 potential derelict traps (including 6% possible identification error) with 905 active buoyed traps (863 in the lower York and 42 in Sarah Creek).

Example 2

In a long term study of degradable cull panels made from PCL and PHA, degradable cull ring panels were deployed in crab traps that were either actively fished or submerged continuously. The PCL grade that was used was CAPA® 6500 (supplied by Perstorp UK Ltd., Cheshire, United Kingdom), a high molecular weight polycaprolactone that showed promise in preliminary studies. The PHA grade that was used was Mirel™ P1004, a PHA formulation (including additives and mineral fillers) with high toughness that showed promise in preliminary studies, whereas some other PHA formulations were brittle and had a high failure rate when being actively fished, irrespective of the extent of degradation. Utilizing a set schedule, the degradable cull panels were removed from the water, dried, and weighed at specified times. With the polymers and designs used in this example, failure of a degradable cull panel is unlikely to occur if degradation by weight is less than 20%, but failure is very likely to occur when degradation by weight exceeds 40%.

As is apparent in FIG. 3, degradable cull panels made from PCL (CAPA® 6500) that were actively fished reached the 20% degradation threshold within about 45 days on average. As shown in FIG. 3, PCL panels that were continuously soaked, simulating an abandoned trap, did not reach the 20% degradation threshold until about 520 days. Setting aside any assumptions or line-fitting, none of the four PCL panels that were continuously soaked had greater than 11% degradation even after 200 days of being submerged continuously in an aquatic environment, whereas more than half of the PCL panels that were regularly fished showed greater than 20% degradation within 53 days (and in many cases sooner than that). Therefore, degradable panels made from PCL degraded much faster when actively fished than when continuously soaked. This is a marked contrast to degradable panels made from PHA, which degraded faster when continuously soaked than when actively fished, as described below.

Degradable cull panels made from PHA (Mirel™ P1004) panels that were actively fished reached the 20% loss threshold at about 330 days as shown in FIG. 1, based on line-fitting and assuming a linear rate of decay during the period of active fishing. In contrast, PHA panels that were continuously soaked (i.e., not regularly fished) reach the 20% degradation threshold on average at about 90 days, and reach the 40% degradation threshold on average in about 180 days (see FIG. 1). Of the eight PHA degradable cull panels that were continuously soaked, six of them reached at least 35% degradation within 86 days. The other two reached at least 18.5% degradation within 203 days. In other words, most of the samples failed or were on the verge of failure within 3 months. In contrast, of the 100 PHA degradable cull panels that were regularly fished, with weight sampling performed between 30 and 175 days, only one (out of 100) had reached the 20% degradation threshold at the time of its testing.

This is an unexpected and important result. PHA panels degraded faster when continuously submerged than when actively fished, which is ideal for the intended use of the degradable cull panels. In fact, as shown in FIG. 1, the component degrades by weight at least twice as much when the trap is abandoned and continuously submerged than when the trap is actively fished. This faster degradation by weight is also true for periods of three months. It is not easy to balance the need for sufficient durability while the trap is actively fished with the need for rapid degradation once a trap becomes derelict. In contrast to other degradable polymer materials, PHA cull panels had the unexpected advantage of degrading at a faster rate once continuously submerged than while being actively fished. This is an enormous benefit, as it allows one to meet the difficult balancing act described above.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a trap" means one trap or more than one trap.

Any ranges cited herein are inclusive.

We claim:

1. An apparatus comprising:
   a fishing implement having a boundary defining an enclosed space sufficient to house a targeted aquatic species; and
   a degradable identification component attached to said fishing implement;
   wherein said degradable identification component comprises a polyhydroxyalkanoate polymer; and
   wherein said degradable identification component degrades by weight at last twice as much when said fishing implement and said degradable identification component are continuously submerged for six months than when said fishing implement and said degradable identification component are actively fished for six months, wherein when said fishing implement and said degradable identification component are actively fished for six months said fishing implement and said degradable identification component are temporarily removed from water being fished regularly or periodically within the six months.

2. The apparatus of claim 1, wherein said identification component is a tag.

3. The apparatus of claim 2, wherein said tag includes the name of the owner of said fishing implement.

4. The apparatus of claim 2, wherein said tag includes a warning against the theft of said fishing implement.

5. The apparatus of claim 2, wherein said tag includes a warning against the theft of the contents of said fishing implement.

6. The apparatus of claim 1, wherein said identification component is a permit.

7. The apparatus of claim 6, wherein said permit is issued by a state.

8. The apparatus of claim 6, wherein said permit limits the quantity of fishing implements allowed in a jurisdiction.

9. The apparatus of claim 8, wherein said jurisdiction is a state's territorial waters.

10. The apparatus of claim 1, wherein said fishing implement is a trap.

* * * * *